United States Patent Office

Re. 26,875

Reissued May 12, 1970

26,875

PREPARATION OF MACROCYCLIC COMPOUNDS

Nissim Calderon, Akron, Ohio, assignor to The Goodyear Tire & Rubber Company, Akron, Ohio, a corporation of Ohio No Drawing. Original No. 3,439,057, dated Apr. 15, 1969, Ser. No. 664,947, Sept. 1, 1967. Application for reissue Aug. 7, 1969, Ser. No. 853,563

Int. Cl. C07c *3/10*

U.S. Cl. 260—666 6 Claims

Matter enclosed in heavy brackets [ ] appears in the original patent but forms no part of this reissue specification; matter printed in italics indicates the additions made by reissue.

ABSTRACT OF THE DISCLOSURE

The invention described is one of preparation of unsaturated large ring alicyclic compounds by subjecting, acyclic unsaturated compounds containing at least two non-conjugated double bonds and containing at least 16 carbon atoms, to a catalyst which is a mixture of (a) at least one organo metallic compound wherein the metal is from Groups Ia, IIa, IIb and IIIa of the Periodic Table of Elements, (b) at least one metal salt wherein the metal is selected from the group of molybdenum and tungsten and (c) at least one compound of the general formula RYH wherein Y is from the group of oxygen and sulfur and R is a radical selected from the group of hydrogen, alkyl, aryl, aralkyl, alkaryl and alkenyl and when Y is S, R may be a thioalkyl, thioaralkyl and a thiolkaryl and when Y is O, R is an alkoxy, alkaryloxy or an aralkoxy and radicals of alkyl, aryl, aralkyl, alkaryl, and alkenyl which a hydrogen is substituted by a thiol or a hydroxyl group. These unsaturated large ring alicyclic compounds are useful as intermediates to produce such things as large ring ketones which in turn are useful as perfume bases.

This invention relates to a novel method of preparation of unsaturated large ring alicyclic compounds and the products obtained thence. More particularly, it concerns with the conversion of various organic unsaturated materials, which will be classified extensively later, into compounds possessing large alicyclic rings containing at least one cabon to carbon double bond by exposure of said unsaturated materials to catalysts whose compositions are described elsewhere in this specification.

The term "unsaturated large ring alicyclic compounds," used throughout the present invention, relates to the group of materials characterized by the presence of at least one alicyclic ring containing at least twelve carbon atoms in said ring skeleton and at least two carbon atoms of the said ring are connected by a double bond.

Prior to the present invention, a common method of synthesis of large ring alicyclic compounds from acyclic precursors involved in the intramolecular reaction of a linear alpha, omega-disubstituted compounds, for instance, the Acyloin condensation:

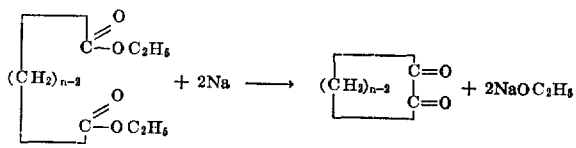

According to the present invention at least one acyclic unsaturated hydrocarbon corresponding to the general formula:

$$R'—CH_2—CH=CH—Z—CH_2—CH=CH—CH_2—R''$$

wherein:

(1) R′ and R″ may be at least one member of a group consisting of alkyl, aryl, alkenyl, aralkyl, alkaryl, cycloalkyl, cycloalkenyl, bicycloalkyl, bicycloalkenyl radicals and hydrogen;

(2) Z is a hydrocarbon fragment containing at least 9 carbon atoms situated in linear succession between the methylidene group, =CH, and the methylene group, —$CH_2$, and may contain both carbon-carbon single bonds and carbon-carbon double bonds;

(3) any of said carbon atoms in the linear succession of Z may be substituted by at least one member of the group consisting of alkyl, aryl, alkenyl, aralkyl, alkaryl, cycloalkyl, cycloalkenyl, bicycloalkyl and bicycloalkenyl radicals;

(4) any of the said carbon atoms in the linear succession of Z may be constituents of aromatic rings and alicyclic rings; and (5) the said acyclic unsaturated hydrocarbon contains no conjugated double bonds is converted into at least one macrocyclic compound possessing alicyclic unsaturated rings, said rings comprising at least 12 carbon atoms and said rings containing at least one carbon to carbon double bond.

For example, the intramolecular metathesis reaction of the two double bonds in the following acyclic diolefin leads to the formation of butene-2 and an unsaturated alicyclic compound denoted by "I"

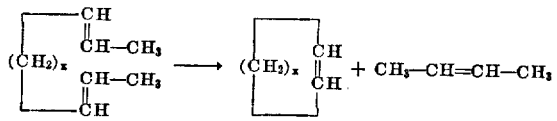

The example in the previous paragraph is not meant to imply that butene-2 is always formed in the preparation of the macrocyclic compounds possessing alicyclic rings from the acyclic unsaturated hydrocarbons which are the starting materials. The second compound that is formed, in addition to the macrocyclic compound possessing the alicyclic unsaturated ring, will depend upon what R′ and R″ are in the formula $$R'—CH_2—CH=CH—Z—CH_2—CH=CH—CH_2—R''$$

In the example above, R′ and R″ were hydrogens. If they had been methyl groups, the second compound formed would have been hexene-3.

The occurrence of an intermolecular olefin metathesis side reaction, which may occur in addition to the intramolecular reaction such as that desired as illustrated in the formula above, will lead to acyclic rather than alicyclic unsaturated molecules. This intermolecular metathesis can be exemplified as follows, where the new acyclic compound is denoted by "II":

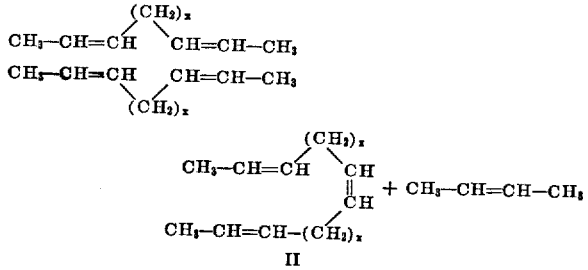

II

The acyclic compound II may further undergo either an intramolecular methathesis to yield a large unsaturated alicyclic compound or an intermolecular olefin metathesis reaction to yield another acyclic unsaturated molecule. molecule. One may adjust the reaction conditions by employing sufficient amounts of diluent leading to an enhancement of the intramolecular mode of reaction, thus obtaining high proportions of large ring unsaturated alicyclic compounds. A dilution of about 10% or lower of the acyclic unsaturated molecule in an inert diluent will usually cause the mode of reaction to be intramolecular and form high proportions of large ring unsaturated alicyclic compounds. However, a dilution to about 5% or lower of the acyclic unsaturated molecule in the inert diluent is more preferable. Suitable diluents for this purpose are liquids which do not adversely effect the catalyst activity or the olefin metathesis reaction. Representative of such diluents are saturated hydrocarbons such as butane, heptane, hexane, pentane and the like or aromatic hydrocarbons such as benzene, toluene and the like. Hydrocarbons which contain other substituents may also be used provided they are inert.

The precursors employed in the formation of the alicyclic unsaturated compounds of this invention can be any acyclic unsaturated hydrocarbon corresponding to the general formula:

$$R'—CH_2—CH=CH—Z—CH_2—CH=CH—CH_2—R''$$

wherein the limitations are previously set forth in paragraph numbers (1), (2), (3), (4) and (5). These precursors can be long chain high molecular weight polymers containing carbon-to-carbon unsaturation along the polymer chains. For example, polybutadiene 1,4 may be used to form the alicyclic ring according to the following:

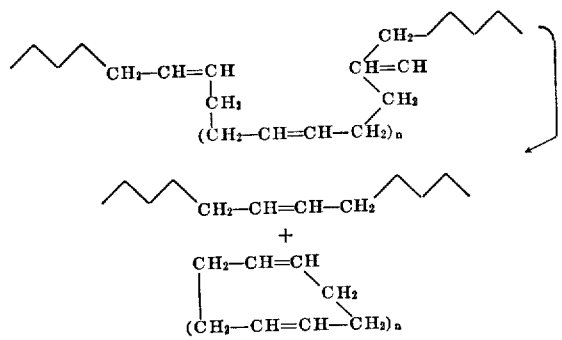

n-2,3,4 . . .

The assortment of ring sizes obtainable from a given unsaturated polymer, an example of which is 1,4-polybutadiene, depends on the structure of the repeat unit. It can be shown that the intromolecular olefin metathesis of 1,4 polybutadiene may lead to rings containing 12, 16, 20, 24 and so forth carbon atoms while a polypentameter may lead to rings of 15, 20, 25, 30 and so forth carbon atoms while a polyoctanometer will lead to rings of 16, 24, 32, 40, and so forth, carbon atoms and polydodecenamer will lead to rings of 12, 24, 36, 48, and so forth carbon atoms.

The following formula, designated by "III" further explains the precursors which may be employed in this invention:

$$R'—CH_2—CH=CH—Z—CH_2—CH=CH—CH_2—R''$$

III wherein R' and R'' can be similar or dissimilar and may represent an alkyl, aryl, alkenyl, aralkyl, alkaryl, cycloalkyl, bicycloalkyl, cycloalkenyl or hydrogen, and Z represents the fragment of III which is characterized by the possession of at least 9 carbon atoms in a backbone sequence. Any of the carbon atoms in Z may be interconnected by either single or double bonds provided that no two double bonds in III are conjugated. Any of the carbon atoms in Z may be substituted by one or more substituents which are members of the group of alkyl, aryl, alkenyl, aralkyl, alkaryl, cycloalkyl, bicycloalkyl, cycloalkenyl and bicycloalkenyl. Any of the carbons in Z may be constituents of aromatic or alicyclic rings.

The selected skeletal formulas set forth below will illustrate the nature of certain Z groups and the resulting large ring unsaturated compounds obtainable by the intramolecular olefin metathesois reaction. It is believed that this will further explain this invention. However, it should be understood that the following formulas are set forth for illustrative purposes only and are not limiting of the scope of the present invention. In the following formulas M is intended to represent any substituent member of the group: alkyl, aryl, alkenyl, aralkyl, alkaryl, cycloalkyl, bicycloalkyl, cycloalkenyl and bicycloalkenyl radicals.

| Z Group | Large Ring Obtainable |
|---|---|
| **Linear Unsubstituted** | |
| $—(CH_2)_n—$ where n is equal to or greater than 9 | 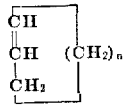 |
| $—(CH_2)_x—CH=CH—(CH_2)_y—$ where x+y is equal to or greater than 7 | 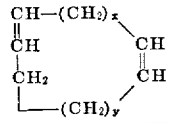 |
| **Linear Substituted** | |
| $—(CH_2)_x—CH(M)—(CH_2)_y—$ where x+y is equal to or greater than 8 | 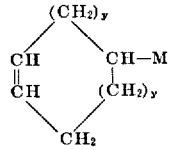 |
| $—(CH_2)_x—CH=CH—CH(M)—(CH_2)_y—$ where x+y is equal to or greater than 6 | 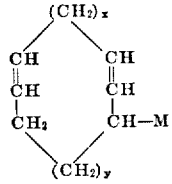 |
| **Alicyclic** | |
| $—(CH_2)_x—S—(CH_2)_y—$ where x+y is equal to 5 or more | 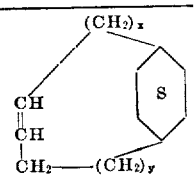 |
| $—(CH_2)_x—C_6H_4—(CH_2)_y—$ where x+y is equal to 6 or more | 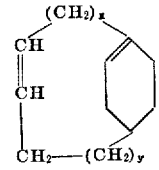 |
| **Bycyclic** | |
| $—(CH_2)_x—C_6H_4—(CH_2)_y—$ where x+y is equal to 5 or more | 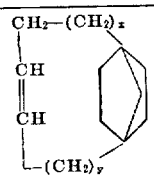 |
| **Aromatic** | |
| $—(CH_2)_x—C_6H_4—(CH_2)_y$ where x+y is equal to 5 or more | 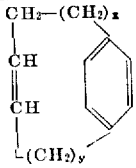 |

It is understood that the above definition includes the polymeric precursors that may contain the group:

$$—CH_2—CH=CH—Z—CH_2—CH=CH—$$

as a segment of the main or side chain of the polymeric molecule.

The intramolecular olefin metathesis process of this invention can be carried out over a wide temperature range from about −100° C. and lower to about 200° C. and higher, but generally, temperatures in the −70° C. to 70° C. range are suitable for this reaction. The pressure is not important and may be varied widely. The reaction proceeds rapidly at room temperature and atmospheric pressure. In several cases exemplified above, the formation of a low molecular weight olefin as the second product of the macrocyclization process in addition to the large ring unsaturated alicyclic compound has been described. Therefore, if one desires to remove the low boiling species produced during the cyclization reaction, employment of sub-atmospheric pressures and elevated temperatures can be employed conveniently, since the large ring compounds possess low volatilities and the separation is thus easily achieved.

A class of catalysts employed in the macrocyclization reaction of this invention is a combination comprising (A) at least one organo-metallic compound wherein the metal is selected from the group consisting of Ia, IIa, IIb and IIIa groups of the Periodic Table of Elements, (B) at least one metal salt wherein the metal is selected from the group consisting of molybdenum and tungsten, and (C) at least one compound of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl, and thioalkaryl, (8) when Y is O, R is alkoxy, arylalkoxy, and alkaryloxy, and radicals of (2) through (6) wherein at least one hydrogen is substituted by a material selected from hydroxyl (OH) and thiol (SH) groups. The Periodic Table of Elements referred to may be found in the Handbook of Chemistry and Physics, 44th Edition, April 1962 reprint, published by the Chemical Rubber Publication Company, Cleveland, Ohio, U.S.A., page 448.

Representative examples of metals from which the organo-metallic compound, the first or (A) component of the catalyst system of this invention, can be derived are lithium, sodium, potassium, rubidium, cesium, beryllium, magnesium, calcium, strontium, barium, zinc, cadmium, aluminum gallium, indium and thallium. The preferred organo-metallic compounds are compounds of lithium, sodium, magnesium, aluminum, zinc, and cadmium with aluminum being most preferred.

Representative examples of organo-metallic compounds useful as the first or (A) catalyst component of this invention are aluminum compounds having at least one aluminum-to-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum and the like; triarylaluminums such as tritolylaluminum, tribenzylaluminum, triphenylaluminum and the like; dialkylaluminum halides such as diethylaluminum chloride, di-n-propylaluminum chloride, diisobutylaluminum chloride, diethylaluminum bromide, diethylaluminum iodide and diethylaluminum fluoride and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride and the like; arylaluminum hydrides and dihydrides such as diphenylaluminum hydride and phenylaluminum dihydride; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like. Other organo-metallic compounds are also useful in the practice of this invention. Representative of such organo-metallic compounds are organoalkali metal compounds such as alkyllithium compounds as ethyllithium, n-butyllithium, t-butyllithium, and the like; lithium-aluminum-tetraalkyls such as lithium-aluminum-tetrabutyl, lithium-aluminum-tetraethyl and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide and the like; calcium, strontium and barium organo compounds such as barium alkyls and aryls; alkyls and aryls of Group IIb metals such as diethylzinc, diphenylzinc, ethylzinc chloride, diethylcadmium, dibutylcadmium and the like; Grignard agents such as phenylmagnesium bromide may also be employed. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminumsesquihalides.

The metal salts employed in the catalyst of this invention as the second or (B) catalyst component are selected from the salts of molybdenum and tungsten. Representatives of such salts include halides such as chlorides, bromides, iodides, and fluorides, which include compounds such as molybdenum pentachloride, tungsten hexachloride, molybdenum pentabromide, tungsten hexabromide, molybdenum pentaiodide, tungsten hexaiodide, molybdenum pentafluoride, molybdenum hexafluoride, and tungsten hexafluoride. Other representative salts are those of acetylacetonates, sulphates, phosphates, nitrates and the like which include compounds such as molybdenum phosphate, tungsten phosphate, molybdenum, nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides representative of which are tungsten hexachloride and molybdenum pentachloride.

The third or (C) component of the catalyst system of this invention are compounds which respond to the formula R—Y—H wherein Y is selected from the group consisting of oxygen and sulfur and R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl, and thioalkaryl, (8) when Y is O, R is alkoxy, arylalkoxy, and alkaryloxy, and (9) radicals of (2) through (6) wherein at least one hydrogen of R is substituted by at least one hydroxyl (OH) or thiol (SH) group.

Thus, the formula above defines a number of types of compounds. It defines water (HOH), hydrogen sulfide (HSH), both saturated and unsaturated alcohols (ROH), mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of the materials responding to the formula above are alcohols representative of which are methanol, ethanol, isopropanol, tertiarylbutyl alcohol, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl, and similar mercaptans, allyl mercaptan, thiophenol, 4-methylthiophenol, 4-mercaptophenol; the hydroperoxides such as cumyl hydroperoxide, tertiarybutyl hydroperoxide; the hydrodisulfides such as cumyl hydrodisulfide, t-butyl hydrodisulfide; the polyalcohols such as ethylene glycol, glycerol, and similar polyglycols; catechol, resorcinol, hydroquinone, pyrogallol; the polymercaptans such as 1,3-propane dithiol, 1,4-dithiobenzene; the hydroxymercaptans or thioalcohols such as ethane-2-ol-1-thiol, 1-hydroxy-4-thiobenzene.

On of the unusual and distinguishing features of the catalyst system of this invention is that the compounds of the formula R—Y—H, wherein R and Y have been previously defined, depending on the particular diolefin employed, the particular organo-metallic compound and the particular Group VIb metal salt chosen and on the particular R—Y—H compound chosen, when employed in fairly substantial amounts are known to reduce drastically the activity of the olefin-metathesis reaction by which the macrocyclization of this invention occurs. An unexpected high activity of the catalyst of the present invention was found when compounds of the R—Y—H type were employed in relatively small amounts and added according to the teachings set forth in the present specification and examples. Since the instant invention contemplates the use of organo-metallic compounds in combination with transition metal salts and various oxygen and sulfur-containing compounds, and since various factors or considerations will influence the optimum range of the three catalyst components in relation to each other, the molar ratios of the three components which optimize the reaction conditions cannot be readily set forth. However, by following the teachings found in this application, those skilled in the art can readily determine the optimum molar ratio of the three catalyst components to each other. Obviously, if one employs the oxygen or sulfur-containing compound, or as is designated above, component C in relatively large amounts, the activity of the catalyst will be reduced considerably or even destroyed.

It has been found that good results are obtained in the practice of this invention when the molar relationship between the three catalyst components, A, B, and C as previously defined, are within a molar ratio of B/C ranging from about 0.3/1 to at least about 20/1 and the molar ratio of A/B is within the range of about 0.5/1 to at least 15/1. More preferred ratios are B/C of 0.5/1 to 5/1 and A/B of 0.5/1 to 8/1. Still more preferred ratios are B/C of 1/1 to 2/1 and A/B of 0.75/1 to 5/1.

The catalysts employed in this invention are prepared by mixing the components by known techniques. Thus, the catalysts may be prepared by "preformed" or "in situ" techniques. By the "preformed" method the catalyst components are mixed together prior to exposure of any of the catalyst components to the unsaturated compound to be used in the macrocyclization reaction. In the "in situ"

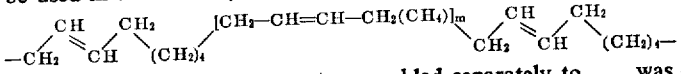

method the catalyst components are added separately to the unsaturated compound to be used in the macrocyclization reaction. The catalyst components may be mixed either as pure compounds or as suspensions or solutions in liquids which do not adversely affect catalyst activity or the olefin-metathesis reaction. Representative of such liquids are saturated hydrocarbons such as hexane, pentane and the like or aromatics such as benzene, toluene and the like.

While the presence of the unsaturated precursor is not essential during the formation of active catalyst by a mixing of components A, B, and C and this fact facilitates the use of "preformed" catalysts, it has been found that freshly preformed catalysts are generally more active than catalysts which have been allowed to age before use.

The order of addition of the three catalyst components to each other is of interest in the practice of this invention. There are various methods in which the three catalyst components can be brought into contact with the unsaturated precursor or unsaturated precursor/solvent mixture. The following is a numerical listing of these various methods in which A, B, and C stand for the catalyst components as previously defined:

(1) Simultaneous addition of A, B and C.
(2) C followed by A and B which were previously preformed.
(3) A and B preformed followed by C.
(4) A followed by B and C which were preformed.
(5) B and C preformed followed by A.
(6) B followed by A and C which were preformed.
(7) A and C preformed followed by B.
(8) A followed by B followed by C.
(9) B followed by A followed by C.
(10) C followed by B followed by A.
(11) C followed by A followed by B.
(12) B followed by C followed by A.
(13) A followed by C followed by B.
(14) Preformed A, B, and C which was prepared by adding A to B and C preformed.
(15) Preformed A, B, and C which was prepared by adding B to A and C preformed.
(16) Preformed A, B, and C which was prepared by adding C to A and B preformed.

Of these various procedures, procedures 6, 7, 11, 13, and 15 listed above are methods of preparations which reduce somewhat the catalytic activity. The remaining of the listed procedures 1, 2, 3, 4, 5, 8, 9, 10, 12, 14, and 16 lead to the most active catalyst systems.

The amount of catalyst employed in the macrocyclization reaction of this invention may be varied over wide concentrations and has not been found to be critical. Of course, a catalytic amount of the catalyst must be empolyed. The optimum amount of catalyst depends upon a number of factors such as temperature, unsaturated precursors used, purity of precursors, reaction times desired and the like. Those skilled in the art will readily determine the optimum catalytic ranges. The macrocyclization can be conducted wherein the amount of catalyst employed is about 0.01 part by weight of B per 100 parts by weight of unsaturated precursor employed, with components A and C adjusted to yield a desirable atomic ratio of A/B/C.

The practice of this invention is further illustrated by reference to the following examples which are intended to be representative rather than restrictive of the scope of the invention.

EXAMPLE 1

A 3.0 gram sample of purified polyoctenamer prepared by the chain opening polymerization of cyclooctene and having the structural formula:

was dissolved in 50 ml. of dried benzene under a nitrogen atmosphere. The viscous cement was treated with 1.0 ml. of a 0.05 molar solution of tungsten hexachloride ($WCl_6$) in benzene, which was prereacted with ethanol ($C_2H_5OH$) so that the molar ratio of $WCl_6/C_2H_5OH$ equaled 1;1, followed by a 1.5 mole of a 0.20 molar solution of ethylaluminum dichloride (EADC) in benzene and thus maintaining an Al/W/O molar ratio of 6/1/1. The mixture was allowed to react for 15 minutes before terminated by introduction of 2.0 ml. benzene solution containing 0.03 gram of tetraethylene pentamine (TEPA) and 0.02 gram of di-ter-butyl-p-cresol and evaporated to dryness. The reaction mixture was extracted three times with 50 ml. portions of 1:1 volume ratio of an isopropanol/hexane solvent system and a low, molecular weight extractable portion thus isolated. Parent mass spectroscopic analysis by low voltage mass spectroscopy was carried out and it was found that the extractable mixture was comprised of components possessing molecular weights according to the series: $220+n\times110$ (n=0, 1, 2, 3 . . .). This corresponds to a dimer (when n=0), a trimer (when n=1), a tetramer (when n=2), and so forth, of the repeating monomer unit of the original polyoctenamer, that is $—CH_2—CH=CH—CH_2—(CH_2)_4—$. The Nuclear Magnetic Resonance spectroscopic analysis (NMR) of the low molecular weight extractable portion indicates the presence of one vinylene double bond for every eight carbons, similar to cyclooctene and polyoctenamer, and possessing three types of hydrogens (A) vinylic: (CH=CH); (B) allylic: ($CH_2$—CH=CH); and (C) methylenic: ($CH_2$). The relative ratio of vinylic/allylic/methylenic types of hydrogens was found to be essentially 1/2/4. Methyl hydrogens: ($CH_3$) or terminal unsaturation type of hydrogens: ($CH=CH_2$) were not detected in the NMR spectrum.

Hence, the mass spectroscopy and NMR spectroscopy results reveal that the low molecular weight extractable portion consists of a mixture of macrocyclics of the general formula:

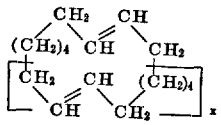

where x=1, 2, 3 . . .

For x=1, the ring is of 16 carbons, 2 double bonds and has a molecular weight of 220. For x=2, the ring is of 24 carbons, 3 double bonds and has a molecular weight of 330. For x=3, the ring is of 32 carbons, 4 double bonds and has a molecular weight of 440. This series of molecular weights is consistent with the experimentally determined low voltage mass spectroscopy and the structure presented above is consistent with the NMR spectrum analysis.

EXAMPLE 2

A 20 gram sample of macrocyclic mixture, which was prepared by a procedure similar to the one described in Example 1, was fractionated by molecular distillation and four fractions isolated as follows:

| Fraction No. | Fractionation conditions: Temp. (° C.) | Fractionation conditions: Pressure (mm./Hg) | Composition (percent)*: $C_{16}$ | $C_{24}$ | $C_{32}$ | $C_{40}$+ higher |
|---|---|---|---|---|---|---|
| 1 | 85 | 1.5 | 85 | 15 | | |
| 2 | 120 | 1.0 | 32 | 66 | 2 | |
| 3 | 175 | 0.5 | | 82 | 18 | |
| 4 | 210 | 0.3 | | 4 | 96 | |
| Pot residue | | | | | 10 | 90 |

* Composition was determined by gas chromatography.

The NMR anaylses of the fractions indicated that all had essentially the same spectra which was also identical to the spectrum of mixture before fractionation. Only vinylic, allylic and methylenic hydrogens were found and in a ratio of 1/2/4.

Fraction No. 4, contained almost pure cyclic tetramer of cyclooctene (4% cyclic trimer). This fraction was catalytically hydrogenated, using H. C. Brown's Hydro-Analyzer procedure, and the hydrogenated product was analyzed by NMR, low voltage mass spectroscopy and X-ray diffraction. The NMR indicated one and only one type of hydrogens, namely, methylenic: ($CH_2$). The molecular weight obtained by low voltage mass spectroscopy was 448 which is in perfect agreement with $(CH_2)_{32}$. The crystallographic d-spacings of the solid $C_{32}H_{64}$ macrocylic found to be 3.75 A. and 4.53 A.

EXAMPLE 3

A 3.0 gram sample of purified polybutadiene, which was prepared by the ring-opening polymerization of 1,5-cyclooctadiene, and had the structural formula:

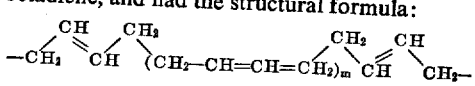

was dissolved in 50 ml. benzene under nitrogen and treated with the $EADC/WCl_6/C_2H_5OH$ catalyst system as in Example 1. After termination and extraction of the low molecular weight product as described in Example 1, parent mass determination by low voltage mass spectroscopy and NMR analysis were carried out. The molecular weights found in the extractable portion by mass spectroscopy comprised of the series: $162+n\times54$ (n=0, 1, 2, 3 . . .), which are consistent with the molecular weights of butadiene oligomers, with the trimer as the lowest member of the series (n=0). The NMR spectrum of the mixture of components in the extractable portion indicates the presence of one vinylene double bond for every four carbons, similar to polybutadiene, and two types of hydrogens: (A) vinylic: (CH=CH); and (B) allylic:

($CH_2$—CH=CH).

The relative ratio of vinylic/allylic was found to be 1/2. The presence of methyl hydrogens: ($CH_3$), methylene hydrogens ($CH_2$), or terminal unsaturation: ($CH=CH_2$) were not detected in the NMR spectrum. Hence, the mass spectroscopy and NMR results reveal that the low molecular weight extractable portion consists of a mixture of macrocylics of the general formula:

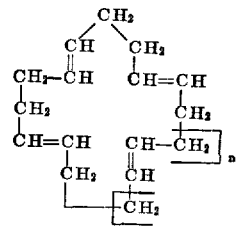

where n=0, 1, 2, 3 . . .

For n=0, the ring is of 12 carbons, three double bonds, and has a molecular weight of 162, i.e. 1,5,9-cyclododecatriene. For n=1, the ring is of 16 carbons, four double bonds and has a molecular weight of 216. This series of molecular weights is consistent with the experimentally determined low voltage mass spectroscopy and the structure consistent with the NMR spectrum. Thus, it can readily be seen that the formation of macrocyclic compounds or mixtures of macrocyclic compounds possessing alicyclic unsaturated rings with a ring size of at least 12 carbon atoms and containing at least one carbon-to-carbon double bond can be prepared from at least one unsaturated compound corresponding to the general formula:

$R'—CH_2—CH=CH—Z—CH_2—CH=CH—CH_2—R''$

While certain representative embodiments and details have been shown for the purpose of illustrating the invention, it will be apparent to those skilled in this art that various changes and modifications may be made therein without departing from the spirit or scope of the invention.

What is claimed is:

1. A macrocyclization process which comprises subjecting at least one alicyclic unsaturated hydrocarbon corresponding to the formula $R'—CH_2—CH=CH—Z—CH_2—CH=CH—CH_2—R''$ wherein:

(1) R′ and R″ may be at least one member of a group consisting of alkyl, aryl, alkenyl, aralkyl, alkaryl, cycloalkyl, cycloalkenyl, bicycloalkyl, bicycloalkenyl radicals and hydrogen;

(2) Z is a hydrocarbon fragment containing at least 9 carbon atoms situated in linear succession between the methylidene group, =CH, and the methylene group, —$CH_2$, and may contain both carbon-carbon single bonds and carbon-carbon double bonds;

(3) any of said carbon atoms in the linear succession of Z may be substituted by at least one member of the group consisting of alkyl, aryl, alkenyl, aralkyl, alkaryl, cycloalkyl, cycloalkenyl, bicycloalkyl and bicycloalkenyl radicals;

(4) any of the said carbon atoms in the linear succession of Z may be constituents of aromatic rings and alicyclic rings; and (5) the said acyclic unsaturated hydrocarbon contains no conjugated double bonds while said hydrocarbon is diluted to about 10% in an inert diluent to a catalyst which is a mixture of (a) at least one organo metallic compound wherein the metal is from groups Ia, IIa, IIb and IIIa of the Periodic Table of Elements, (b) at least one metal salt wherein the metal is selected from the group of molybdenum and tungsten and (c) at least one compound of the general formula RYH wherein Y is from the group of oxygen and sulfur and R is a radical selected from the group of hydrogen, alkyl, aryl, aralkyl, alkaryl and alkenyl and when Y is S, R may be a thioalkyl, thioaralkyl and a thioalkaryl and when Y is O, R is an alkoxy, alkaryloxy or an aralkoxy and radicals of alkyl, aryl, aralkyl, alkaryl and alkenyl which is hydrogen is substituted by a thiol or a hydroxyl group to form at least one macrocyclic compound possessing alicyclic unsaturated rings comprising at least 12 carbon atoms and containing at least one carbon-to-carbon double bond.

2. A method according to claim 1 in which the organo metallic compound of (a) is an organoaluminum compound, the transition metal salt of (b) is a tungsten halide and in the compound defined in (c), Y is oxygen.

3. A method according to claim 2 wherein the compound defined in (c) is an alcohol.

4. The macrocyclization process of claim 2 in which the compound defined by the formula is a polyalkenamer.

[5. A composition of matter comprising a cyclic polymer corresponding to the formula

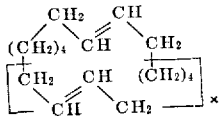

where x=1, 2, 3 . . .]

6. A composition of matter comprising a cyclic polymer corresponding to the formula

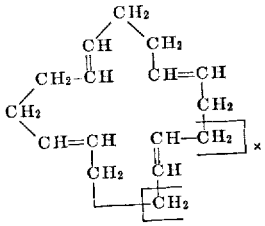

where n=1, 2, 3 . . .

*7. A composition of matter comprising a cyclic polymer corresponding to the formula*

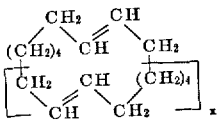

*where x=2, 3 . . .*

References Cited

The following references, cited by the Examiner, are of record in the patented file of this patent or the original patent.

UNITED STATES PATENTS

| | | | |
|---|---|---|---|
| 3,257,332 | 6/1966 | Ziegler | 252—429 |
| 3,259,616 | 6/1966 | Grammer et al. | 260—85.5 |

FOREIGN PATENTS

| | | |
|---|---|---|
| 6,601,466 | 8/1966 | Netherlands. |
| 6,605,105 | 10/1966 | Netherlands. |
| 667,392 | 11/1956 | Belgium. |
| 1,425,601 | 1/1966 | France. |

OTHER REFERENCES

A. J. Hubert, J. Chem. Soc., 1963, pp. 4088 and 4090.

DELBERT E. GANTZ, Primary Examiner

V. O'KEEFE, Assistant Examiner

PO-1050
(5/69)

UNITED STATES PATENT OFFICE
CERTIFICATE OF CORRECTION

Patent No. Reissue 26,875 Dated May 12, 1970

Inventor(s) Nissim Calderon Page 1

It is certified that error appears in the above-identified patent and that said Letters Patent are hereby corrected as shown below:

Column 1, line 46, "cabon" should read -- carbon --.

line 57, "in" should be deleted.

Column 2, line 68, between "large" and "unsaturated" insert --ring--.

Column 3, line 10, "effect" should read -- affect --.

line 47, "intromolecular" should read --intramolecular--

Column 4, the first formula under the title "Alicyclic" shown as:

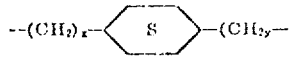

should be:

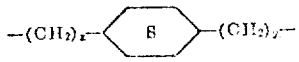

Column 7, line 9, "On" should read -- One --.

Column 8, under "Example 1", the formula (shown in column 7) should be moved to the right to be directly under "Example 1".

Column 9, first formula (after first paragraph) shown as:

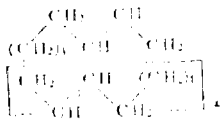

should be:

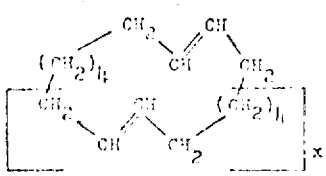

Column 11, line 33, "is" (first occurrence) should read --a--.
Column 11 (Claim 5), the formula shown as:
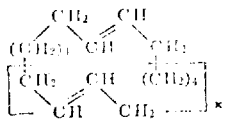
should be:
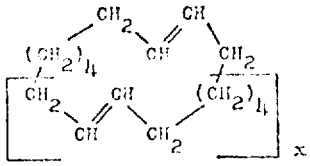
Column 12 (Claim 6), the formula shown as:
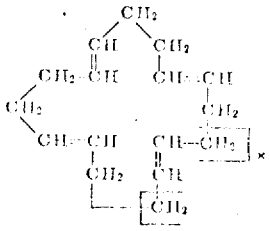
should be:
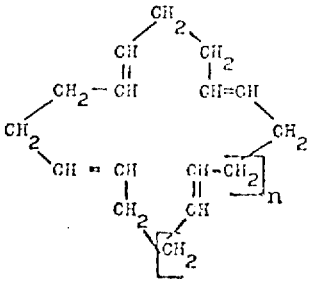
Column 12 (Claim 7), the formula shown as:
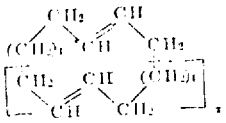
should be:
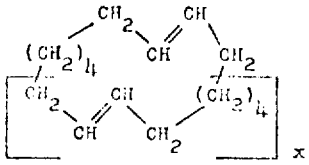
SIGNED AND
SEALED
NOV 24 1970
(SEAL)
Attest:
Edward M. Fletcher, Jr.
Attesting Officer
WILLIAM E. SCHUYLER, J
Commissioner of Patent